United States Patent [19]

Tamai et al.

[11] Patent Number: 5,731,978
[45] Date of Patent: Mar. 24, 1998

[54] METHOD AND APPARATUS FOR ENHANCING VEHICLE NAVIGATION THROUGH RECOGNITION OF GEOGRAPHICAL REGION TYPES

[75] Inventors: Haruhisa Tamai; Simon Desai; Laura L. White, all of Sunnyvale, Calif.

[73] Assignee: Zexel Corporation, Tokyo, Japan

[21] Appl. No.: 480,759

[22] Filed: Jun. 7, 1995

[51] Int. Cl.[6] .................................................. G06F 165/00
[52] U.S. Cl. ............................... 364/444.1; 364/449.2; 364/449.7; 364/450; 340/988; 342/357
[58] Field of Search ................. 364/424.027, 424.029, 364/424.031, 443, 444.1, 444.2, 449.2, 449.3, 449.4, 449.6, 450; 340/990, 995, 988; 342/357, 450

[56] References Cited

U.S. PATENT DOCUMENTS

| | | | |
|---|---|---|---|
| 3,845,289 | 10/1974 | French | 364/436 |
| 4,570,227 | 2/1986 | Tachi et al. | 364/444.2 |
| 4,608,656 | 8/1986 | Tanaka et al. | 364/449.6 |
| 4,611,293 | 9/1986 | Hatch et al. | 364/571.03 |
| 4,672,565 | 6/1987 | Kuno et al. | 364/571.04 |
| 4,673,878 | 6/1987 | Tsushima et al. | 364/449.2 |
| 4,723,218 | 2/1988 | Hasebe et al. | 364/449.2 |
| 4,734,863 | 3/1988 | Honey et al. | 364/449.1 |
| 4,751,512 | 6/1988 | Longaker | 342/357 |
| 4,782,447 | 11/1988 | Ueno et al. | 364/449.2 |
| 4,796,191 | 1/1989 | Honey et al. | 364/450 |
| 4,797,841 | 1/1989 | Hatch | 364/571.04 |
| 4,832,563 | 5/1989 | Ando et al. | 364/571.05 |
| 4,862,398 | 8/1989 | Shimizu et a. | 364/571.05 |
| 4,914,605 | 4/1990 | Loughmiller, Jr. et al. | 364/443 |
| 4,918,609 | 4/1990 | Yamawaki | 364/449.1 |
| 4,926,336 | 5/1990 | Yamada | 364/444.2 |
| 4,937,753 | 6/1990 | Yamada | 364/449.3 |
| 4,964,052 | 10/1990 | Ohe | 364/449.2 |
| 4,970,652 | 11/1990 | Nagashima | 364/449.2 |
| 4,972,319 | 11/1990 | Delorme | 340/990 |
| 4,982,332 | 1/1991 | Saito et al. | 364/449.2 |
| 4,984,168 | 1/1991 | Neukrichner et al. | 364/449.4 |
| 4,989,151 | 1/1991 | Nuimura | 364/449.1 |
| 4,992,947 | 2/1991 | Nuimura et al. | 364/449.4 |
| 4,996,645 | 2/1991 | Schneyderberg Van der Zon | 364/443 |
| 4,999,783 | 3/1991 | Tenmoku et al. | 364/450 |
| 5,040,122 | 8/1991 | Neukirchner et al. | 364/449.1 |
| 5,046,011 | 9/1991 | Kakihara et al. | 364/449.3 |
| 5,060,162 | 10/1991 | Ueyama et al. | 364/449.3 |
| 5,177,685 | 1/1993 | Davis et al. | 364/443 |
| 5,283,743 | 2/1994 | Odagawa | 364/457 |
| 5,287,297 | 2/1994 | Ihara et al. | 364/571.02 |
| 5,297,050 | 3/1994 | Ichimura et al. | 364/449.2 |
| 5,475,387 | 12/1995 | Matsumoto | 340/990 |
| 5,594,650 | 1/1997 | Shah et al. | 364/449.1 |

OTHER PUBLICATIONS

R.L. French, "MAP Matching Origins Approaches and Applications," Rober L. French & Associates, 3815 Lisbon St., Suite 201, Fort Worth, Texas 76107, USA, pp. 91–116.

*Primary Examiner*—Collin W. Park
*Attorney, Agent, or Firm*—Hickman Beyer & Weaver, LLP

[57] ABSTRACT

A method for navigating with a vehicle navigation system using recognition of geographical region types in a map database. The system's map database stores information representative of a plurality of geographical region types. A geographical region type of a geographical region in which the navigation algorithm is operating is determined. At least one parameter related to the navigation algorithm is then set to correspond to the geographical region type. Navigation is performed using the navigation algorithm. Throughout the operation of the navigation algorithm, the system repeatedly determines whether the geographical region type has changed, and if so, changes the algorithm parameter(s) to correspond to the new geographical region type.

31 Claims, 6 Drawing Sheets

METHOD AND APPARATUS FOR ENHANCING VEHICLE NAVIGATION THROUGH RECOGNITION OF GEOGRAPHICAL REGION TYPES

BACKGROUND OF THE INVENTION

The present invention relates to the use of map database characteristics in vehicle navigation. More specifically, the parameters related to the navigation algorithms employed by the vehicle navigation system are altered to correspond to the database characteristics of the particular geographical regions being searched.

A map database used in a vehicle navigation system typically stores positional data representative of a system of roads. Different geographical regions in the map database have different characteristics which have varying impacts on the effectiveness of the navigation algorithms employed by the system. For example, urban areas are either fully or very densely digitized, i.e., all or most roads are represented in the database, while rural or "inter-town" areas are only sparsely digitized. This difference often presents a problem for maneuver generation algorithms in that for sparsely digitized regions, existing roads which are not included in the database may cause confusion when actually encountered by the user on the road. An example of this problem is described below with reference to FIG. 1.

In FIG. 1, Highway CA-121 is shown changing directions abruptly at point A from a generally north/south direction to an east/west direction. With current vehicle navigation systems, there is no way of knowing for sure whether or not there are any other roads connected to point A. If this portion of CA-121 is in a sparsely digitized region, there may indeed be other such roads as represented by the dotted lines. The confusion arises when the vehicle navigation system makes no mention of this intersection and simply instructs the user to continue driving on CA-121. As the user approaches the intersection, it may not be clear whether this instruction means for her to continue in the direction she was travelling, i.e., straight, or to make the near right angle maneuver shown. On the other hand, if the system is programmed to assume that non-represented roads are connected to every turn in a given road or highway, other complications may result. For example, the system would generate maneuvers for each such turn, even where no other roads exist, thus making route determination and maneuver generation more complex and risking confusion of the user. Obviously, the generation of such confusion runs counter to the intended purpose of a vehicle navigation system.

Another set of characteristics which differ from region to region relate to the uniformity with which roads are arranged. For example, in many major urban areas, roads are often arranged in a regular grid pattern which is easily represented in a digital database. By contrast, in rural or hilly areas, road layouts rarely adhere to anything regular like a grid pattern, often intersecting at widely varying angles, or exhibiting many bends and curves. Such irregularly shaped roads are much more difficult to represent in digital form than the regular pattern of downtown city streets. As a result of this limitation, the stored representations of roads in non-grid pattern regions are, in general, inherently more inaccurate than those in grid pattern regions.

The difference in database accuracy between grid and non-grid regions has undesirable consequences for vehicle positioning algorithms as will be described with reference to FIGS. 2a–d. For example, if a vehicle positioning algorithm uses an error region 202 around a dead-reckoned position 204 to generate position possibilities 206, the differing levels of database accuracy make the selection of the size of error region 202 problematic. If the size of error region 202 is chosen with reference to an urban downtown area (FIG. 2a), it might not be large enough to compensate for the inaccuracies of a hilly, non-grid pattern area as shown in FIG. 2b where the only reasonable position possibilities 206 lie outside region 202. Conversely, if the size of error region 202 is chosen with reference to a hilly area (FIG. 2c), it might be so large that too many position possibilities 206 would be encompassed when the navigation system attempted to position the vehicle in a city as shown in FIG. 2d.

Therefore, a vehicle navigation system is needed which distinguishes between different types of regions in its map database, and adjusts the parameters related to its navigation algorithms accordingly to provide for more accurate and efficient vehicle navigation.

SUMMARY OF THE INVENTION

The present invention provides a vehicle navigation system which is capable of recognizing the characteristics of a geographical region in which a navigation algorithm is operating, and, in response, altering the parameters related to the navigation algorithm so that it operates more efficiently in that region. For example, when the vehicle navigation system of the present invention recognizes that its maneuver generation algorithm is operating in a sparsely digitized region of the map database, it will provide maneuver instructions for selected nodes to which it is likely roads are connected that are not represented in the database. Likewise, in fully digitized areas, the maneuver generation algorithm will assume that no connecting roads exist where none are indicated, thus avoiding the communication of unnecessary maneuvers to the user. Essentially, this feature of the present invention has the effect of providing extra guidance in hilly or rural areas while eliminating extraneous maneuver instructions in urban areas.

In another embodiment, when the vehicle navigation system of the present invention recognizes that its vehicle positioning algorithm is operating in an urban grid pattern area, it adjusts the size of the search region employed to identify position possibilities to correspond to the denser and more regular layout of the region. Similarly, in a non-grid pattern area, the system employs a larger search region than the search region employed in a grid pattern area.

More generally, according to the present invention, a vehicle navigation system is disclosed in which the map database stores information representative of a plurality of geographical region types. The system determines the type of geographical region in which a navigation algorithm is operating, sets at least one parameter related to the navigation algorithm to correspond to that geographical region type, and performs navigation with the algorithm. The system then determines whether the geographical region type in which the algorithm is operating has changed, and, if the algorithm is operating in a different type of region, changes the appropriate parameters related to the algorithm to correspond to the different geographical region type. This process is repeated throughout the operation of the navigation algorithm.

In one embodiment, the system recognizes and distinguishes between fully and sparsely digitized regions in the map database. In another embodiment, the system recognizes and distinguishes between grid pattern regions and non-grid pattern regions. The characteristics of these region types are discussed below.

In various embodiments, the navigation algorithm comprises a route determination algorithm, a maneuver generation algorithm, or a vehicle positioning algorithm.

A further understanding of the nature and advantages of the present invention may be realized by reference to the remaining portions of the specification and the drawings.

DESCRIPTION OF THE PREFERRED EMBODIMENT

The present invention relates generally to commonly assigned U.S. Pat. No. 5,345,382 to Kao for CALIBRATION METHOD FOR A RELATIVE HEADING SENSOR, and U.S. Pat. No. 5,359,529 to Snider for ROUTE GUIDANCE ON/OFF-ROUTE STATE FILTER, and commonly assigned, United States patent applications for POSITION CORRECTION METHOD FOR VEHICLE NAVIGATION SYSTEM, Ser. No. 08/000,950 filed on Jan. 5, 1993, now U.S. Pat. No. 5,374,933, METHOD FOR SELECTING A DESTINATION IN A VEHICLE NAVIGATION SYSTEM, Ser. No. 08/099,207 filed on Jul. 29, 1993, METHOD FOR IDENTIFYING HIGHWAY ACCESS RAMPS FOR ROUTE CALCULATION IN A VEHICLE NAVIGATION SYSTEM, Ser. No. 08/263,604 filed on Jun. 20, 1994, now U.S. Pat. No. 5,515,283, and VEHICLE NAVIGATION SYSTEM WITH UPGRADEABLE NAVIGATION SOFTWARE AND A FLEXIBLE MEMORY CONFIGURATION, Ser. No. 08/293,856 filed on Aug. 19, 1994, the entire specifications of which are incorporated herein by reference.

Figure 3:
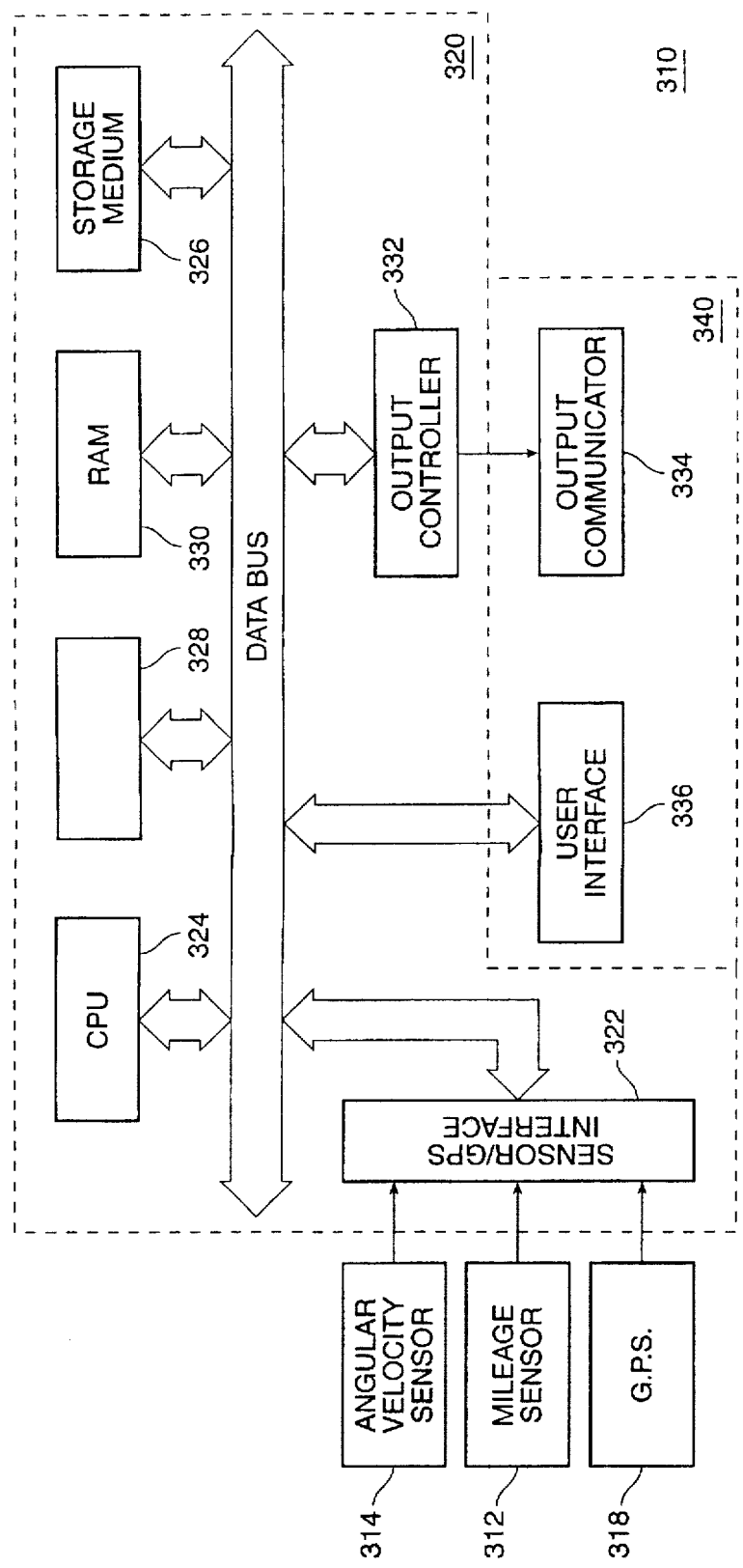
FIG. 3 is a block diagram of a vehicle navigation system for use with the present invention.

FIG. 3 is a block diagram of a specific embodiment of a vehicle navigation system 310 for use with the present invention. Sensors 312 and 314 and GPS receiver 318 are coupled to computing means 320 through sensor/GPS interface 322. In typical embodiments, mileage sensor 312 comprises an odometer, and angular velocity sensor 314 comprises a gyroscope, or a differential odometer coupled to the wheels of the vehicle. A global positioning system (GPS) data receiver 318 is provided for receiving signals from, for example, a satellite-based navigation system. Data from sensor/GPS interface 322 is transmitted to CPU 324, which performs calibration, signal processing, dead-reckoning, vehicle positioning, and route guidance functions. A database containing map information may be stored in database medium 326, with software directing the operation of computing means 320 stored in main memory 328 for execution by CPU 324. Memory 328 may comprise read-only memory (ROM), or reprogrammable non-volatile memory such as flash memory or SRAM. System RAM 330 permits reading and writing of the information necessary to execute such software programs. Database medium 326 may comprise non-volatile memory, a hard disk drive, CD-ROM, or an integrated circuit in which digitized map information has been stored. Output controller 332, which may comprise a graphics controller, receives data processed by CPU 324 and transmits the data to display console 340 which includes output communicator 334, usually comprising a display screen. The user may input data, such as a desired destination, through user interface 336, typically comprising a keyboard.

The map database stored in database medium 326 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a hierarchy value which relates to the category or type of the road. For example, the highest level category of the hierarchy includes freeways and expressways. The lowest level includes residential streets and/or alleys.

Specific embodiments of the present invention look at various of these database characteristics to determine in which type of region a current navigation algorithm is operating. For example, the system may measure the road density for a given area by counting the number of roads within the given area and thereby distinguish between fully and sparsely digitized regions. Another way of determining whether a region is fully or sparsely digitized involves looking at the categories of the roads in the region. If, for example, a region contains mostly or only highways, then it may be designated a sparsely digitized region. If, for example, there are no streets connected to entrance and exit ramps of a highway, or the streets which are connected are very short, the region through which the highway is running is likely a sparsely digitized one.

Likewise, database characteristics may also be used to determine whether or not a region is a grid pattern region. Again, the road density may be measured in a given area because grid pattern regions generally have significantly higher density than non-grid pattern regions. Similarly, road segment lengths between intersections or junctions in the region may be measured, the ratio of the number of cross roads per unit distance being another indication of the road density in the region. The system may also look at the angles at which selected roads are intersected by cross roads, the roads in grid pattern regions tending to lie at substantially right angles to each other. Another database characteristic which is helpful in determining whether or not a region is a grid pattern region is referred to as a shape point. A shape point is a coordinate in a road which corresponds to a bend in the road. If the number of shape points per unit length of a road is high, or the angle of the road at a shape point is sharp, then the road is a windy road and the region is likely not a grid pattern region. It will be understood that the above-described strategies for determining the type of a geographic region are merely illustrative, and are by no means the only strategies which may be employed. Additionally, any of these strategies may be used alone or in combination with one or more of the others.

Still further embodiments of the invention include explicit information stored in the map database regarding the characteristics of particular geographic regions. For example, regions such as urban areas are designated fully digitized while rural or "inter-town" areas are designated sparsely digitized. In other embodiment, areas in which streets are laid out in a regular grid-like pattern, such as a downtown urban area, are designated as grid pattern regions while hilly or rural areas in which the streets are irregularly laid out are designated non-grid pattern areas. As will be discussed, these designations have certain consequences with regard to the operation of various navigation algorithms. Because the database in these embodiments includes this information, the system does not need to determine in which type of region the navigation algorithm is operating in the manner described above. Rather, the determination may be made merely by looking at the area type designation.

As mentioned above, the effectiveness of a navigation algorithm employed by a vehicle navigation system may vary depending upon the type of geographic region in which the algorithm is operating. The vehicle navigation system of the present invention determines the type of geographic region in which its navigation algorithms are operating and adjusts various parameters to, in effect, improve the performance of the algorithms in that region. Specific examples of this are discussed below.

Figure 1:
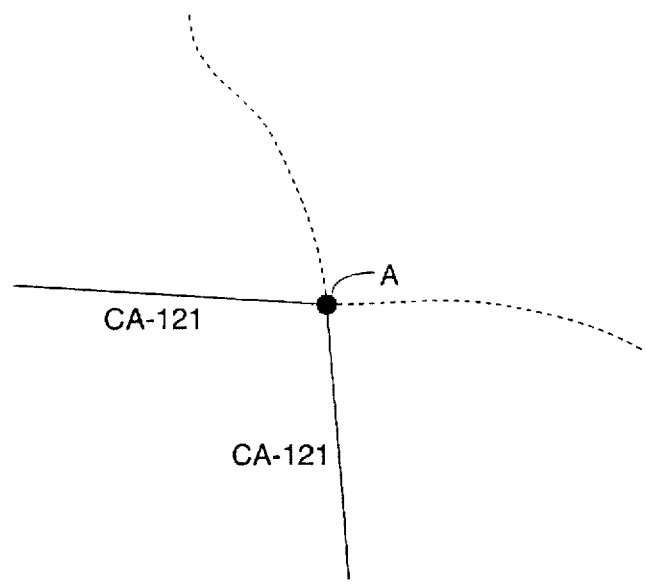
FIG. 1 illustrates one of the problems encountered when a maneuver generation algorithm cannot distinguish between fully and sparsely digitized regions in a map database.

The maneuver generation algorithm employed by a specific embodiment of the invention generates a series of maneuver instructions based on a calculated route which are then communicated to the user. The algorithm operates with varying levels of effectiveness depending upon whether it is operating in a fully or sparsely digitized region. Referring back to FIG. 1, the maneuver generation algorithm first determines whether it is operating in a fully or sparsely digitized region of the map database. If operating in a sparsely digitized region, the algorithm will assume that there are non-represented roads connected to point A and generate a maneuver which instructs the user to negotiate the intersection appropriately. If, however, the algorithm is operating in a fully digitized region, it will assume that no non-represented roads are connected to point A if no such roads are represented in the database. In such a situation, the algorithm will not generate a maneuver corresponding to point A. Thus, by first determining the level of digitization of a region, the maneuver generation algorithm is able to change the level of detail of the maneuvers to be communicated to the user. In other words, the maneuver generation algorithm is manipulated so that additional maneuvers are provided in sparsely digitized regions while unnecessary maneuvers are eliminated in fully digitized regions. In a related embodiment, the system simply includes these additional maneuvers in regions in which the proportion of segments above a certain link class level exceeds a some fixed value. Link class refers to the type of road (e.g., freeway, highway, expressway, major street, etc.), with the larger road types being of higher link classes. Thus, if a particular region has a high proportion of freeways to surface streets, it is likely a sparsely digitized region.

Figure 4A:
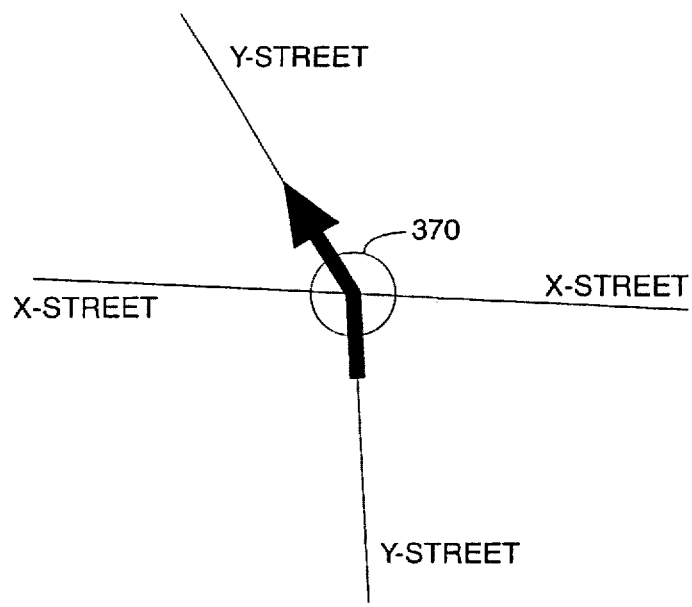
FIGS. 4a–c illustrate the operation of one embodiment of the present invention in the context of maneuver generation.
Figure 4B:
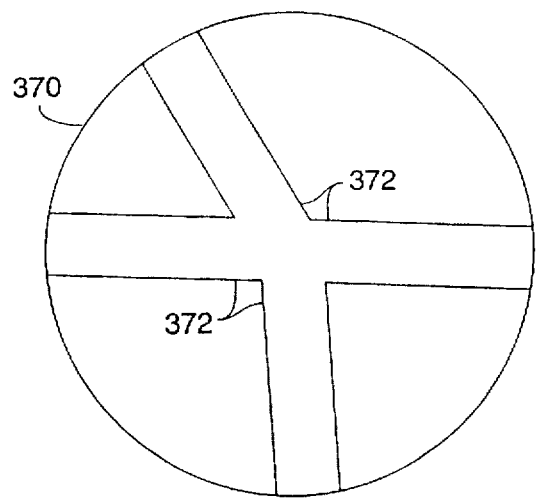

According to another specific embodiment of the invention, the maneuver generation algorithm is manipulated with respect to whether the vehicle is determined to be operating in a grid pattern region or a non-grid pattern region. Referring to the intersection shown in FIG. 4a, if the route is as shown by the arrow, the maneuver generation algorithm must determine whether a maneuver should be generated to alert the user to the geometry of the intersection (i.e., that the Y-street bears left after crossing X-street). Whether or not a maneuver should be generated depends, in large part, on the nature of detail area 370. In a grid-pattern region (e.g., a downtown area), the road casements 372 in detail area 370 are likely to be angular as shown in FIG. 4b. Thus, as the user approaches the intersection, it is likely that she will know to continue onto Y-street without being alerted. Therefore, in grid-pattern regions, the maneuver generation algorithm would generalize such an intersection to a simple four-way junction with angular casements and would not generate a maneuver.

Figure 4C:
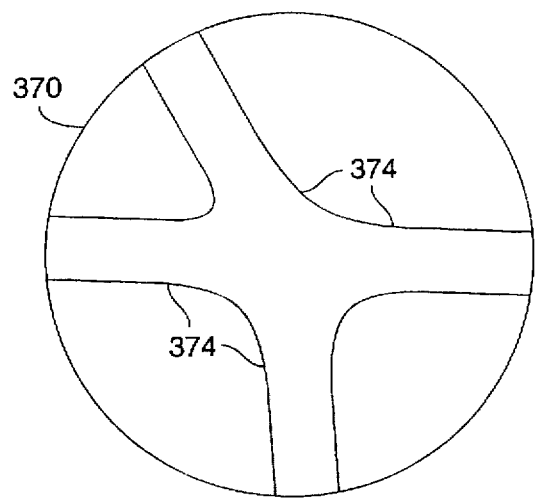

If, however, the region in which the vehicle is operating is determined to be a non-grid pattern region, the road casements are likely to be configured in any of a wide variety of geometries such as, for example, the rounded casements 374 of FIG. 4c. With such geometries, it may not be clear to the user as she approaches an intersection upon which road she should continue. Therefore, in non-grid pattern regions, the maneuver generation algorithm would not generalize the intersection geometry and would instead generate a maneuver which would alert the user to the particular geometry of the intersection and the proper road segment upon which to proceed. For example, the system could alert the user to "REMAIN ON Y-STREET, BEARING LEFT AFTER CROSSING X-STREET."

Figure 2A:
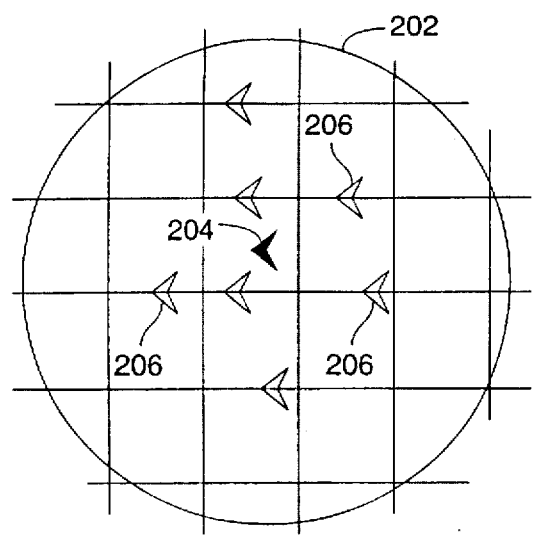
FIG. 2a–d illustrate problems encountered when employing a fixed search region in a vehicle positioning algorithm.
Figure 2B:
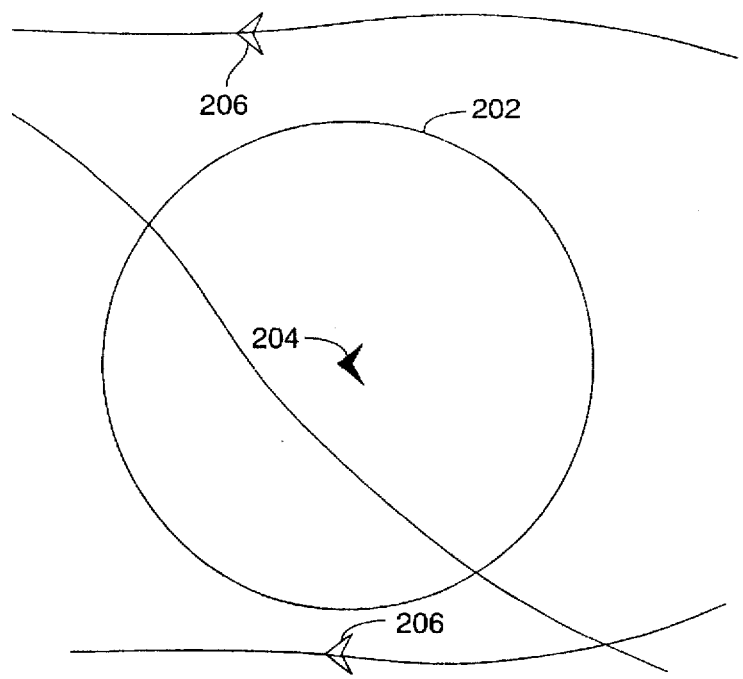
Figure 2C:
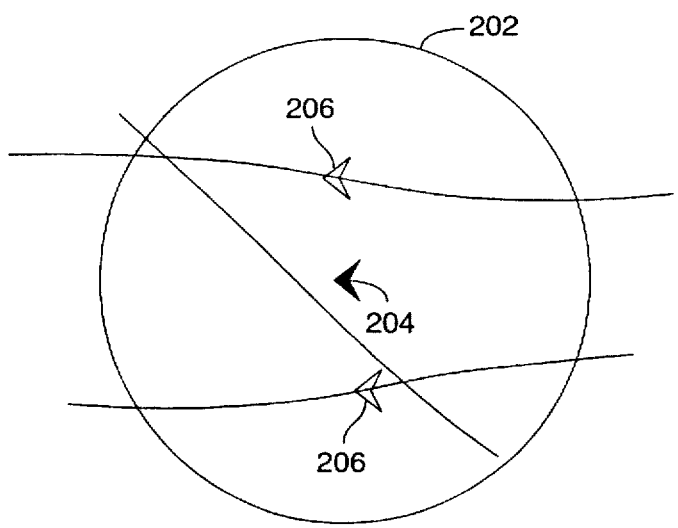
Figure 2D:
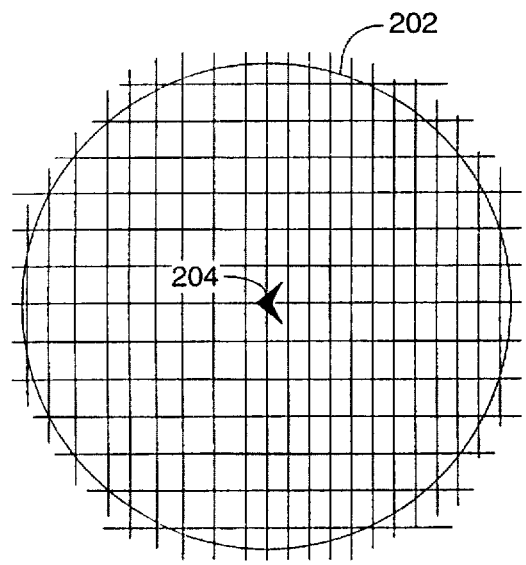

The vehicle positioning algorithm employed by another specific embodiment of the invention repeatedly positions the vehicle with respect to the map database to compensate for the accumulated position error due to system sensor inaccuracy. The algorithm generates position possibilities within a search area around the vehicle's dead reckoned position and adjusts the size of this search area to correspond to the type of area in which the algorithm is operating. Referring back to FIGS. 2a–d, when it is determined that the vehicle positioning algorithm is operating in an urban area, i.e., a fully digitized region or a grid pattern region, a smaller error region 202 is employed as shown in FIG. 2a. If, however, it is determined that the algorithm is operating in an "inter-town", rural, or hilly area, i.e., a sparsely digitized region or a non-grid pattern region, a larger region 202 is employed as shown in FIG. 2c. In this way, the search or error region employed by the system's vehicle positioning algorithm is manipulated to correspond to the characteristics of the specific map database region, thereby providing the algorithm with a sufficient number of vehicle position possibilities for accurate vehicle positioning.

In a more specific embodiment, the vehicle positioning algorithm distinguishes between grid pattern regions having different road densities, regions with densities higher than a certain level being referred to as downtown grid pattern regions. In such regions, an even smaller search or error region may be employed.

In another embodiment, the vehicle positioning algorithm employs a global positioning satellite (GPS) signal for determining the vehicle's absolute position in sparsely digitized or non-grid pattern regions, increasing the possible GPS multipath error region in fully digitized or grid pattern regions. This is due to the fact that urban areas generally have many high buildings and overpasses which make reception of the GPS signal unreliable.

The route determination algorithm employed by another specific embodiment of the invention determines a route from the vehicle's current location to a destination input by the user. The system adjusts the values of segment and node costs when determining the route depending upon the type of region in which the segment or node resides. If, for example, a node is in a fully digitized region or a grid pattern region, the algorithm might adjust the node cost upward given that a left turn at a downtown intersection generally takes longer than a left turn in a rural area. Similarly, a segment cost in a fully digitized region or a grid pattern region may be upwardly adjusted given that traffic is generally heavier in urban areas. Conversely, node and segment costs in sparsely digitized regions or non-grid pattern regions may be downwardly adjusted to correspond to the characteristics of these types of regions.

Figure 5:
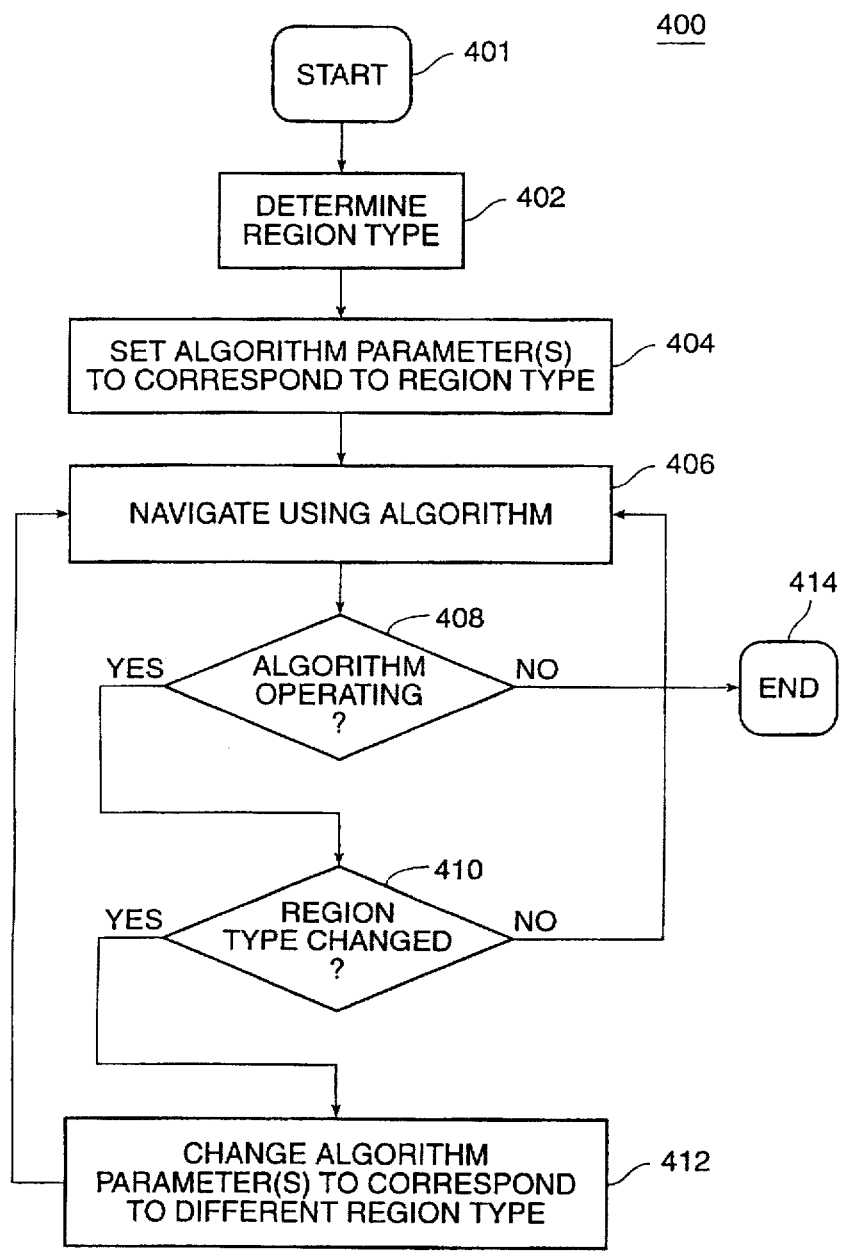
FIG. 5 is a flowchart which describes the operation of a specific embodiment of the invention.

FIG. 5 is a flowchart 400 which describes the operation of a specific embodiment of the invention. Initially, the system determines in which type of geographical region a navigation algorithm (e.g., route determination, maneuver generation, or vehicle positioning) is currently operating (step 402). In various embodiments of the invention, this includes an analysis of at least one database characteristic, such as road density, in the current geographical region. The system then sets at least one parameter related to the navigation algorithm to correspond to the geographical region type (step 404). The system then navigates using the navigation algorithm (step 406). This might include, for example, at least one determination of the vehicle's position, or determination of a portion of a route to a final destination. If the algorithm is still operating (step 408), the system determines whether the current geographical region has changed to a different geographical region type (step 410). If a different region type is determined, the system changes the appropriate parameters to correspond to the different geographical region type (step 412). If the region type has not changed, the algorithm continues to operate using the same parameters. These steps are repeated while the navigation algorithm is operating. In general, for the route determination algorithm, this is when the route to the desired destination has been determined; for the maneuver generation algorithm, this is when all maneuvers have been determined; and for the vehicle positioning algorithm, this is when the system is not in use.

While the embodiments described above refer to fully vs. sparsely digitized regions, and grid-pattern vs. non-grid-pattern regions, it will be understood that there are many other types of regions classifications to which the present invention may be applied. For example, a variety of region classifications is employed by different embodiments of the present invention. These include, but are not limited to, urban/suburban vs. rural, windy vs. straight, hilly vs. flat, angular road casements vs. rounded road casements. In various embodiments of the invention (where the region classification is not included in the map database), these classifications are determined according to a variety of criteria. As with non-grid pattern regions, windy road regions may be determined by counting the number of shape points in the road segments in the region. This information may also be employed with other information to determine other region classifications. For example, shape point per segment counts may be employed along with information regarding the density with which a region is digitized to determine whether a region is urban/suburban or rural. In addition, shape point counts, in conjunction with information regarding intersection angles, may be employed to determine whether a region is a grid pattern or non-grid pattern region. Shape point counts may also be employed with altitude change information to determine whether a region is likely to have angular or rounded road casements. It will be understood that the factors which may be employed to determine region classification are numerous and are not limited to those described above.

Each region classification scheme is related to and affects the operation of one or more navigation algorithms. As noted above, the urban/suburban vs. rural classification scheme affects any navigation algorithms which make use of GPS (e.g., a vehicle positioning algorithm). This is due to the fact that GPS reception is unreliable in downtown urban areas. Therefore, when the system recognizes that it is operating in an urban area, GPS is either not used or reliance on GPS is reduced. Fortunately, map matching techniques for vehicle positioning are more accurate in urban than in rural areas and may be used instead. Two-dimensional GPS data also are not used in hilly regions as opposed to flat regions. This is due to the fact that the two-dimensional GPS data are inaccurate in regions which exhibit altitude changes.

In addition to the relationship between vehicle positioning and densely vs. sparsely digitized regions described above, the vehicle positioning algorithm employed by various embodiments of the invention is affected by both the windy vs. straight and the hilly vs. flat region classifications. In regions with windy as opposed to straight roads, map matching is difficult, therefore, the vehicle positioning algorithm may depend more on other positioning techniques such as GPS in these regions. In hilly regions, segment lengths stored in the map database are not as accurate as for flat regions. Therefore, in hilly regions, positioning techniques which employ odometer readings (e.g., map matching) would rely more heavily on other positioning techniques.

In addition to being affected by the densely vs. sparsely digitized classification and the grid pattern vs. non-grid pattern classification as described above, the maneuver generation algorithm of the present invention is affected by the windy vs. straight and the angular vs. rounded road casement classifications. For windy as opposed to straight regions, the number of maneuvers generated is increased because of unusual and potentially confusing road and intersection geometries encountered by the user of the system. For the angular vs. rounded road casement classification, the effect on maneuver generation is the same as described above with reference to FIGS. 4a–c. Moreover, for densely digitized regions, shorter distance and time intervals are employed between successive alerts to the user about upcoming maneuvers than in sparsely digitized regions.

For the route calculation algorithm employed by a specific embodiment of the invention, the segment costs assigned to road segments are upwardly adjusted for regions with windy roads in comparison to regions with straight roads. This allows the route calculation to take increased travel time into account when determining the best route to a particular destination.

While the invention has been particularly shown and described with reference to specific embodiments thereof, it will be understood by those skilled in the art that the foregoing and other changes in the form and details may be made therein without departing from the spirit or scope of the invention. Therefore, the scope of the invention should be determined with reference to the claims.

What is claimed is:

1. A method for navigating using a vehicle navigation system having a map database, the map database having information stored therein which is representative of a plurality of geographical region types, the vehicle navigation system employing a navigation algorithm, the method comprising the steps of:
  (A) determining a geographical region type of a geographical region in which the navigation algorithm is currently operating;
  (B) setting a first parameter related to the navigation algorithm to correspond to the geographical region type;
  (C) navigating using the navigation algorithm with the first parameter;
  (D) determining whether the geographical region type has changed to a different geographical region type;
  (E) changing the first parameter to correspond to the different geographical region type if the geographical region type has changed; and
  (F) repeating steps (C)-(E) while the navigation algorithm is operating.

2. The method of claim 1 wherein the plurality of geographical region types comprises fully digitized regions and sparsely digitized regions.

3. The method of claim 2 wherein the navigation algorithm comprises a route determination algorithm.

4. The method of claim 3 wherein the first parameter comprises segment costs assigned to road segments and node costs assigned to intersections.

5. The method of claim 2 wherein the navigation algorithm comprises a maneuver generation algorithm.

6. The method of claim 5 wherein the first parameter comprises a level of detail of route maneuvers to be communicated to a user of the vehicle navigation system.

7. The method of claim 2 wherein the navigation algorithm comprises a vehicle positioning algorithm.

8. The method of claim 7 wherein the first parameter comprises a region which includes possible vehicle positions.

9. The method of claim 2 wherein step (A) comprises analyzing at least one database characteristic in the geographical region to determine the geographical region type.

10. The method of claim 9 wherein the at least one database characteristic is taken from the group comprising density of roads and types of roads.

11. The method of claim 1 wherein the plurality of geographical region types comprises grid pattern regions and non-grid pattern regions.

12. The method of claim 11 wherein the navigation algorithm comprises a vehicle positioning algorithm.

13. The method of claim 12 wherein the first parameter comprises a region which includes possible vehicle positions.

14. The method of claim 12 wherein the first parameter comprises a global positioning satellite (GPS) signal.

15. The method of claim 11 wherein the navigation algorithm comprises a route determining algorithm.

16. The method of claim 15 wherein the first parameter comprises segment costs assigned to road segments and node costs assigned to intersections.

17. The method of claim 11 wherein step (A) comprises analyzing at least one database characteristic in the geographical region to determine the geographical region type.

18. The method of claim 17 wherein the at least one database characteristic is taken from the group comprising distances between intersections, angles between road segments at intersections, and curvature of roads.

19. A vehicle navigation system comprising:
  a plurality of sensors for generating signals corresponding to heading and direction;
  a map database for storing information which is representative of a plurality of geographical region types; and
  a data processing module which is operable to:
    determine a geographical region type of a geographical region in which a navigation algorithm employed by the vehicle navigation system is currently operating;
    set a first parameter related to the navigation algorithm to correspond to the geographical region type;
    navigate using the signals generated by the sensors and the navigation algorithm with the first parameter;
    determine whether the geographical region type has changed to a different geographical region type; and
    change the first parameter to correspond to the different geographical region type if the geographical region type has changed.

20. A method for determining a route using a vehicle navigation system having a map database, the map database having information stored therein which is representative of fully digitized regions and sparsely digitized regions, the vehicle navigation system employing a route determination algorithm, the method comprising the steps of:
  (A) determining whether a current region in which the route determination algorithm is operating is a fully digitized region or a sparsely digitized region;
  (B) setting a first parameter related to the route determination algorithm to correspond to the current region;
  (C) determining a portion of the route using the route determination algorithm with the first parameter;
  (D) determining whether the current region has changed to a different region;
  (E) changing the first parameter to correspond to the different region if the current region has changed; and
  (F) repeating steps (C)-(E) until the route is fully determined.

21. The method of claim 20 wherein the first parameter comprises segment costs assigned to road segments and node costs assigned to intersections.

22. A method for generating maneuver instructions using a vehicle navigation system having a map database, the map database having information stored therein which is representative of fully digitized regions and sparsely digitized regions, the vehicle navigation system employing a maneuver generation algorithm, the method comprising the steps of:
  (A) determining whether a current region in which the maneuver generation algorithm is operating is a fully digitized region or a sparsely digitized region;
  (B) setting a first parameter related to the maneuver generation algorithm to correspond to the current region;
  (C) generating maneuvers for a portion of the route using the maneuver generation algorithm with the first parameter;
  (D) determining whether the current region has changed to a different region;
  (E) changing the first parameter to correspond to the different region if the current region has changed; and
  (F) repeating steps (C)-(E) until all maneuvers for a route are determined.

23. The method of claim 22 wherein the first parameter comprises a level of detail of route maneuvers to be communicated to a user of the vehicle navigation system.

24. A method for monitoring a vehicle's position using a vehicle navigation system having a map database, the map database having information stored therein which is representative of fully digitized regions and sparsely digitized regions, the vehicle navigation system employing a vehicle positioning algorithm, the method comprising the steps of:

(A) determining whether a current region in which the vehicle positioning algorithm is operating is a fully digitized region or a sparsely digitized region;

(B) setting a first parameter related to the vehicle positioning algorithm to correspond to the current region;

(C) determining the vehicle's position using the vehicle positioning algorithm with the first parameter;

(D) determining whether the current region has changed to a different region;

(E) changing the first parameter to correspond to the different region if the current region has changed; and (F) repeating steps (C)–(E) while the vehicle positioning algorithm is operating.

25. The method of claim 24 wherein the first parameter comprises a region which includes possible vehicle positions.

26. A method for monitoring a vehicle's position using a vehicle navigation system having a map database, the map database having information stored therein which is representative of grid pattern regions and non-grid pattern regions, the vehicle navigation system employing a vehicle positioning algorithm, the method comprising the steps of:

(A) determining whether a current region in which the vehicle positioning algorithm is operating is a grid pattern region or a non-grid pattern region;

(B) setting a first parameter related to the vehicle positioning algorithm to correspond to the current region;

(C) determining the vehicle's position using the vehicle positioning algorithm with the first parameter;

(D) determining whether the current region has changed to a different region;

(E) changing the first parameter to correspond to the different region if the current region has changed; and (F) repeating steps (C)–(E).

27. The method of claim 26 wherein the first parameter comprises a region which includes possible vehicle positions.

28. The method of claim 26 wherein the first parameter comprises a global positioning satellite (GPS) signal.

29. A method for determining a route using a vehicle navigation system having a map database, the map database having information stored therein which is representative of grid pattern regions and non-grid pattern regions, the vehicle navigation system employing a route determination algorithm, the method comprising the steps of:

(A) determining whether a current region in which the route determination algorithm is operating is a grid pattern region or a non-grid pattern region;

(B) setting a first parameter related to the route determination algorithm to correspond to the current region;

(C) determining a portion of the route using the route determination algorithm with the first parameter;

(D) determining whether the current region has changed to a different region;

(E) changing the first parameter to correspond to the different region if the current region has changed; and (F) repeating steps (C)–(E) until the route is fully determined.

30. The method of claim 29 wherein the first parameter comprises segment costs assigned to road segments and node costs assigned to intersections.

31. A method for improving the efficiency with which an algorithm operates in a vehicle navigation system having a map database, the map database having information stored therein which is representative of a plurality of geographical region types, the method comprising the steps of:

(A) determining a geographical region type of a geographical region in which the algorithm is currently operating;

(B) setting a first parameter related to the algorithm to correspond to the geographical region type;

(C) operating the vehicle navigation system using the algorithm with the first parameter;

(D) determining whether the geographical region type has changed to a different geographical region type;

(E) changing the first parameter to correspond to the different geographical region type if the geographical region type has changed; and (F) repeating steps (C)–(E) while the algorithm is operating.

* * * * *